(12) United States Patent
Egritepe (10) Patent No.: US 9,915,379 B2
(45) Date of Patent: Mar. 13, 2018

(54) PRESS SEAL HAVING AN ELASTOMER BODY

(71) Applicant: Hauff-Technik GmbH & Co. KG, Hermaringen (DE)

(72) Inventor: Senol Egritepe, Heidenheim (DE)

(73) Assignee: Hauff-Technik GmbH & Co. KG (DE)

( * ) Notice: Subject to any disclaimer, the term of this patent is extended or adjusted under 35 U.S.C. 154(b) by 0 days.

(21) Appl. No.: 15/326,376

(22) PCT Filed: Jul. 14, 2015

(86) PCT No.: PCT/EP2015/066055
§ 371 (c)(1),
(2) Date: Jan. 13, 2017

(87) PCT Pub. No.: WO2016/008879
PCT Pub. Date: Jan. 21, 2016

(65) Prior Publication Data
US 2017/0198835 A1    Jul. 13, 2017

(30) Foreign Application Priority Data

Jul. 16, 2014    (EP) .................................... 14177270

(51) Int. Cl.
*F16L 5/08*    (2006.01)
*F16L 21/04*    (2006.01)
(Continued)

(52) U.S. Cl.
CPC .............. *F16L 5/08* (2013.01); *F16J 15/028* (2013.01); *F16L 21/045* (2013.01); *H02G 3/22* (2013.01)

(58) Field of Classification Search
CPC ........ F16L 5/08; F16L 21/045; H02G 15/013; H02G 3/22; F16J 15/028
See application file for complete search history.

(56) References Cited

U.S. PATENT DOCUMENTS 4,061,344 A  * 12/1977  Bradley .................. E04B 1/947
                                                        174/151
5,213,341 A  *  5/1993  Griffiths ................... F16L 5/08
                                                        277/606
(Continued)

FOREIGN PATENT DOCUMENTS

DE           19651659 C1    5/1998
DE      202011102671 U1 * 10/2011  ................ F16L 5/08
(Continued)

OTHER PUBLICATIONS

English language translation of the International Search Report and the Written Opinion of the International Search Authority dated Jan. 17, 2017 for the International Application No. PCT/EP2015/066055 of which the above-captioned U.S. Appl. No. 15/326,376 is a U.S. national phase application.

(Continued)

*Primary Examiner* — Nicholas L Foster
(74) *Attorney, Agent, or Firm* — Wood, Phillips, Katz, Clark & Mortimer (57) ABSTRACT

The invention relates to a press seal (1) for building up a sealing closure of a through-opening intersected by a line, having an elastomer body (2), a press plate (3*a*) and a tensioning bolt (4) intersecting the elastomer body (2), wherein the press plate (3*a*) can be pressed by said tensioning bolt (4) onto said elastomer body (2); the tensioning bolt (4) is screwed into a nut (20) around a rotational axis (21), a section (20*a*) of said nut (20), which section (20*a*) lies proximal to said elastomer body (2), being held by a form-fit in a recess in said press plate (3*a*) and being secured against a rotational movement around said rotational axis (21) thus, a section (20*b*) of said nut (20), which section 20*b* lies distal to said elastomer body (2), comprising a flange which protrudes beyond said recess in directions perpendicular to said rotational axis (21) outwards for transferring a force (Continued)

onto said press plate (3a) and pressing said press plate (3a) onto said elastomer body (2) when said tensioning bolt (4) is tensioned.

15 Claims, 3 Drawing Sheets

(51) Int. Cl.
 *F16J 15/02* (2006.01)
 *H02G 3/22* (2006.01)

(56) References Cited

U.S. PATENT DOCUMENTS

| | | | |
|---|---|---|---|
| 5,340,123 A | 8/1994 | Griffiths | |
| 6,641,143 B2 * | 11/2003 | Richter | F16J 15/065 277/603 |
| 8,621,796 B2 * | 1/2014 | Egritepe | F16L 5/08 277/632 |
| 9,394,442 B2 * | 7/2016 | Adams | C08L 83/04 |
| 2009/0304341 A1 * | 12/2009 | Shimirak | H02G 15/013 385/135 |
| 2011/0156354 A1 * | 6/2011 | Egritepe | F16L 5/08 277/314 |

FOREIGN PATENT DOCUMENTS

| | | | | |
|---|---|---|---|---|
| DE | 202011102671 U1 | 10/2011 | | |
| EP | 1164677 A1 * | 12/2001 | | F16L 5/08 |
| EP | 1930639 A1 * | 6/2008 | | F16L 5/08 |
| EP | 1930639 A1 | 6/2008 | | |
| JP | 58142073 A * | 8/1983 | | F16L 5/08 |

OTHER PUBLICATIONS

The "International Search Report and the Written Opinion of the International Search Authority, or the Declaration" dated "Oct. 2, 2015 (Oct. 2, 2015)" for the International Application No. PCT/EP2015/066055 of which the above-captioned instant U.S. patent application serial No. (not yet designated) is a U.S. national phase application.

* cited by examiner

PRESS SEAL HAVING AN ELASTOMER BODY

FIELD OF THE INVENTION

The present invention relates to a press seal having an elastomer body for sealingly contacting a line led through.

BACKGROUND OF THE INVENTION

Apart from the elastomer body, press seals of that type further comprise a press plate and a tensioning bolt. By tensioning the tensioning bolt, the press plate can be pressed onto the elastomer body so that the latter is compressed in direction of the line. In consequence, the elastomer body expands perpendicularly thereto and sealingly contacts the line led through and for instance the soffit of a wall opening.

The problem to be solved by the present invention is to provide an advantageous press seal and an advantageous method for manufacturing the latter.

BRIEF SUMMARY OF THE INVENTION

According to the invention, this problem is solved by a press seal for building up a sealing closure of a through-opening intersected by a line, having an elastomer body for contacting the line sealingly, a press plate and a tensioning bolt intersecting the elastomer body, wherein the press plate can be pressed by the tensioning bolt onto the elastomer body in such a way that the elastomer body contacts the line sealingly, wherein a threaded portion of the tensioning bolt is screwed around a rotational axis into a nut, a section of the nut, which section lies proximal to the elastomer body, being held by a form-fit in a recess in the press plate and being secured against a rotational movement around the rotational axis thus, a section of the nut, which section lies distal to the elastomer body, comprising a flange which protrudes beyond the recess in directions perpendicular to the rotational axis outwards for transferring a force onto the press plate and pressing the press plate onto the elastomer body when the tensioning bolt is tensioned, and by a method comprising the steps
providing the press plate having the recess;
inserting the nut into the recess;
arranging the elastomer body and the press plate in contact with each other;
and, subsequent to those steps, inserting the tensioning bolt so that it intersects the elastomer body, and screwing the tensioning bolt into the nut.

Preferred embodiments are given in the dependent claims and the description below, wherein no difference is made between apparatus and method or use aspects; at least implicitly, the disclosure relates to all claims categories.

The nut having the flange portion, into which nut the tensioning bolt is screwed in or is being screwed in, can for instance be advantageous in view of the manufacturing of a corresponding press seal. The inventor found out that the insertion of the tensioning bolt, namely pushing the latter through a through hole in the elastomer body, can be easier when combined with a rotational movement. Then, the tensioning bolt is not only pushed along the rotational axis through the elastomer body but is, at the same time, turned around the rotational axis. This can for instance prevent the thread from getting caught at the wall defining the through hole, which can prevent damage of the elastomer body there or ease the pushing through. In particular in mass production, the throughput can be increased for instance.

An alternative approach of the inventor would have been to provide a tensioning bolt having an integrated form-fit member, like a carriage bolt (at the end of the tensioning bolt a polygonal member and a flange protruding outwards with respect thereto are provided). The advantage would have been that both functions, "formfit" and "counter bearing", would have been integrated in a single part, which would have reduced the effort in storage and logistics. However, such a tensioning bolt could, during the insertion into the elastomer body, have only been rotated as long as the form-fit element is not caught. In contrast thereto, with the present invention, the tensioning bolt can be turned over the whole distance when being pushed in/through; with the rotational movement, the tensioning bolt can also be screwed into the nut. Primarily, this shall illustrate an advantage but not limit the scope of the invention; however, a corresponding manufacturing is preferred.

The form-fit holds the proximal section of the nut and the whole nut, thus, "secured against a rotational movement" namely locks a rotational movement of the nut around the rotational axis. The "rotational axis" defines a reference system and is that axis around which the threaded portion rotates when being screwed in, namely is for instance the axis of a rotational symmetry of the cylinder, the grooves of the thread (of the threaded portion) being provided in the lateral surface of this cylinder.

The flange projects beyond the recess "outwards" which relates to the rotational axis as a center, namely from the rotational axis perpendicularly thereto outwards. The "recess" is that portion of a through hole in the press plate, in which portion the form-fit with the nut is formed. For instance, in case that the nut does not extend up to a face of the press plate, which lies proximal to the elastomer body, the portion of the through hole, which portion lies adjacent to the nut and proximal to the elastomer body, is not part of the recess; on the other hand, in case a of correspondingly large nut, the whole through hole can be the recess.

Preferably, the flange protruding beyond the recess outwards has a contact area at the press plate itself for transferring the force during the tensioning of the tensioning bolt, namely at a side of the press plate lying opposite to the elastomer body. In general, a washer could for instance be provided between the flange and the press plate so that the flange does not contact the press plate directly, but transfers a force nevertheless. The respective counter bearing prevents the nut from a sliding along the rotational axis towards the elastomer body, for instance as soon as the flange contacts the press plate, namely prevents the nut from sliding during the tensioning or already when the tensioning bolt is screwed in.

Further, the combination of features according to the invention can for instance be advantageous in view of the size of the contact area between the flange and the press plate being selectable within a certain range, so that for instance a respectively large contact area can be chosen. This can for instance be advantageous in view of transferring the force uniformly onto the press plate and onto the elastomer body thus; a more uniform deformation can for instance be advantageous in view of the material stress and the sealing function.

Alternatively, in case that a nut without a flange would be arranged in a through hole in the press plate, the through hole tapering adjacent to the recess (which forms the form-fit), the nut would contact the press plate with its front face (which would enable the use of a simple nut). However, on the one hand, the resulting contact area would be pre-defined by the size of the nut; on the other hand, in comparison to the solution according to the invention, the contact area would be also closer to the rotational axis, which would result in a more concentrated and more inhomogeneous transfer of the force, thus.

The press plate with the nut inserted contacts a front face of the elastomer body (at a front face with respect to directions parallel to the rotational axis), a further press plate being preferably provided at the opposite front face. Then, during the tensioning, the elastomer body is compressed between the two press plates with respect to directions parallel to the rotational axis so that, perpendicularly thereto, it sealingly contacts the lines and for instance a soffit in the wall of floor element, namely for instance the soffit of a through-opening or a lining tube.

A "press plate" arranged at a front face of the elastomer body can for instance also be mulit-part, namely comprise a plurality of press plate parts. This can for instance apply in case of a press seal for a subsequent mounting on the line. In the elastomer body of such a press seal, a parting slit intersecting the elastomer body connects the through hole for the line with an outer sealing surface of the elastomer body so that the latter can be folded open and placed on the line or the line can be placed in the elastomer body; the parting slit can for instance extend parallely and perpendicularly to the rotational axis through the elastomer body. Preferably, the press plate is parted in a manner matching to the parting slit in the elastomer body such that press seal can be folded open as a whole, namely that the elastomer body with the press plate mounted thereat can be folded open.

The through hole in the elastomer body provided for the line can for instance be provided with a sleeve or a plurality of sleeves nested in each other so that the through hole can be adapted to a line having a larger diameter by taking out a sleeve. Preferably, several sleeves are connected to each other or to the remaining elastomer body by material bridges, wherein a material bridge can be separated for a removal of the respective sleeve.

The sleeves can for instance be provided in total at the same elastomer body and can be separated from each other by cuts extending parallelly to the rotational axis and circumferentially round the latter (preferably be separated apart from material bridges provided at the front face). On the other hand, the elastomer body can also be multi-part, wherein a first elastomer body part comprises a plurality of sleeves and a second elastomer body part comprises a plurality of sleeves as well; the first and the second elastomer body part are assembled such that a sleeve of the first elastomer body part is arranged in the intermediate space between two sleeves of the second elastomer body part, and vice versa.

Metaphorically, the first elastomer body part is, in a sectional plane containing the center axis of the line, provided like a comb, wherein the teeth of the comb correspond to the sleeves, the sleeves of the other elastomer body part (or other elastomer body parts) being provided in the intermediate spaces between these teeth. The sleeves provided in the intermediate spaces can be connected in a comb-like manner as well so that the elastomer body is, in this respect, assembled from two combs pushed into each other with their teeth. Since an intermediate space is provided between the sleeves of an elastomer body part, the sleeves or layers do not have to be manufactured by a cutting process causing effort; a corresponding elastomer body part having sufficiently large intermediate spaces can also be manufactured by a molding process, for instance by injection molding, pressing or transfer pressing.

Referring to the press plate again: perpendicularly to the rotational axis outwards, the recess is defined by a surrounding surface of the press plate; this surrounding surface holds that section of the nut, which lies proximate to the elastomer body, by a form-fit. In a preferred embodiment, this surrounding surface verges directly into a front face of the press plate, which lies distal to the elastomer body, the flange contacting this distal front face. In other words, no deepening for the flange is provided in the front face of the press plate, which lies opposite to the elastomer body (distal thereto); in general, such a deepening could be provided, for instance be made by milling. However, a "direct" transition is preferred so that, if any, a portion having a convex curvature is provided between the surrounding surface and the (distal) front face, the surrounding surface and the distal front face preferably bordering on each other in an edge extending circumferentially around the rotational axis. Thus, preferably, no chamfering is provided, which can for instance be advantageous in view of a large contact area between the flange and the press plate.

In a preferred embodiment, the distal front face is even in its area region so that the press plate has a comparably simple design, which can for instance simplify the handling during the assembly. Further preferred, it is not only the distal front face which is even, but the press plate as a whole is an even plate in its area region. "In its area region" means possibly apart from the outer edges enclosing the area, which edges can for instance be bent in case of a thin metal sheet for a mechanical reinforcement. Preferably, the areal directions lie perpendicularly to the rotational axis.

Particularly preferred, however, the distal front face is even as whole (namely up to the outer edges) and, further preferred, lies perpendicular to the rotational axis. Further, preferably, the press plate as a whole (up to the outer edges) is an even plate, no bent edges being provided.

The preferred material for the press plate is metal, for instance electro galvanized steel, low-alloy or high-alloy stainless steel. In comparison to synthetic material, a metal can be advantageous in view of the stiffness, which can be of interest in view of the preferred even design.

Preferably, the press plate is or is being worked from a metal sheet, for instance by punching, cutting, in particular laser-cutting, or milling. In general, a thin sheet having a thickness of less than 3 mm taken in direction of the rotational axis can be provided, for instance made stiffer by bending up the edges; nevertheless, a thickness of 3 mm at minimum is preferred, wherein 4 mm at minimum are further preferred and 5 mm at minimum are particularly preferred. Possible upper limits can (independently of the lower limits) for instance be not more than 2 cm, 1.5 cm or 1 cm; an upper limit can for instance be advantageous in view of the material consumption and its manufacturability.

In a preferred embodiment, the surrounding surface defining the recess sidewards extends solely in parallel to the rotational axis and free of a step, namely does for instance not extend conically in a portion. Preferably, the surrounding surface has, seen in direction of the rotational axis, a polygonal profile, the edges thereof having further preferred the same length, for instance a square, hexagonal or octagonal profile. The section of the nut, which lies proximal to the elastomer body, preferably has a profile complementary thereto.

Preferably, the whole through hole in the press plate is defined by a surrounding surface extending solely in parallel to the rotational axis and free of a step. The section of the nut, which lies proximal to the elastomer body, can extend through the whole press plate, namely intersect it completely. On the other hand, a through-hole-surrounding-surface extending solely in parallel to the rotational axis and free of a step is also preferred in case of a nut intersecting the press plate not completely, namely in case that not the whole through hole is the recess.

"Free of a step" means an axial extension without abrupt changes of the diameter or, in more general words, of the distance perpendicularly to the rotational axis. Advantageously, a respective through hole can be worked into the press plate more easily, for instance in comparison to milling a through hole having an abrupt change in the distance/diameter. Advantageously, providing a nut having a flange, as suggested by the invention, enables such a simple design of the through hole, because the flange preferably contacts a front face.

In a preferred embodiment, the flange extends, with respect to a circumference around the rotational axis, over the whole circumference, namely projects beyond the recess in all directions perpendicular to the rotational axis from the latter outwards. This can for instance be advantageous in view of maximizing the contact area between the flange and the press plate or in view of a rather homogenous transfer of the contact pressure.

As mentioned above, the features according to the invention allow choosing the contact area between the nut and the press plate more or less independently of the size the nut has in its form-fit section. Preferably, the contact area (between the flange and the press plate) is at least the 1,1-fold, further preferred at least the 1,2-fold, particularly preferred at least the 1,3-fold, of an area of the front face of the nut, namely the front face lying proximal to the elastomer body (opposite to the flange). Possible upper limits can for instance be not more than the 3-, 2.5- or 2-fold. In this respect, the "proximal front face" of the nut is that part which would find a rest against an area extending perpendicularly to the rotational axis.

In a preferred embodiment, the tensioning bolt comprises a bolt head at its end lying opposite to the end screwed into the nut, the bolt head having a bolt head drive, preferably an internal bolt head drive, for instance with an internal hexagonal or torx profile. The tensioning bolt can be rotated via the bolt head drive, for instance during the insertion into the nut while the manufacturing and/or for pressing the press plate onto the elastomer body. In general, for instance, a threaded pin could be screwed into the nut having the flange, and a tensioning nut could be placed on that end of the treaded pin which lies opposite to the nut with flange. However, preferably, a tensioning bolt with a bolt head is provided.

As regards the nut having the flange, it is generally preferred that a hole into which the threaded portion of the tensioning bolt is screwed in is a through hole extending through the nut completely. Further preferred, the whole through hole is provided with an internal thread so that the nut does not limit the screwing in of the tensioning bolt and the tensioning of the press seal thus.

In addition to a bolt head and the threaded portion at the opposite end (which is screwed into the nut), a preferred tensioning bolt further comprises a portion in between which it is free of a thread namely is not threaded, this portion being sealingly contacted by the elastomer body in the tensioned state. The portion without a thread can for instance extend over at minimum 10%, 20% or 30% and (independently thereof) over not more than 80%, 70%, 60% or 50% of the tensioning bolt length taken along the rotational axis (the values are increasingly preferred in their respective order).

As mentioned above, the invention also relates to a method of manufacturing. Therein, the tensioning bolt is being inserted, when the nut is already placed in the recess and the elastomer body and the press plate are already in contact with each other. Preferably, for the assembly, a receiving apparatus is provided, in which the nut lies with its proximal section held by the form-fit, then, pointing upwards; preferably, the nut is laid into the receiving apparatus respectively. Then, the press plate is laid onto the receiving apparatus such that the nut is held in the recess by a form-fit. Then, the elastomer body is laid onto the press plate, wherein the nut is already held in the press plate with the form-fit, the tensioning bolt being screwed in thereafter, preferably after laying a further press plate on the elastomer body. In simple words, during the assembly of a press seal according to the invention, the individual parts can be "stacked" on each other advantageously, namely can be laid on each other step by step, wherein the press seal (or the part thereof assembled already) does not have to be re-oriented in between. "Laying onto" means "placing onto" following the direction of gravity.

Since the flange of the nut preferably contacts the distal front face outside of the through hole (with the recess) in the press plate, the through hole can advantageously be simple with a through-hole-surrounding-surface extending solely in parallel to the rotational axis and free of a step. Preferably, the through hole or the recess is cut by laser cutting which can be advantageous in view of the throughput and the cost, for instance in comparison to milling, namely can be particularly advantageous in mass production.

The invention also relates to the use of a corresponding press seal for sealing an electric, gas, water, heat, telecommunications, signal or data line intersecting a wall of floor element, preferably a building wall or building floor. The press seal can contact the wall of floor element directly, for instance when inserted into a core drill, or can also be inserted into a lining tube casted in.

BRIEF DESCRIPTION OF THE DRAWINGS

Below, the invention is described in further detail by an exemplary embodiment, the description relating to all claims categories and the features being, within the scope of the independent claims, relevant for the invention also in a possible different combination.

In detail it shows

DETAILED DESCRIPTION OF THE PREFERRED EMBODIMENT

Figure 1:
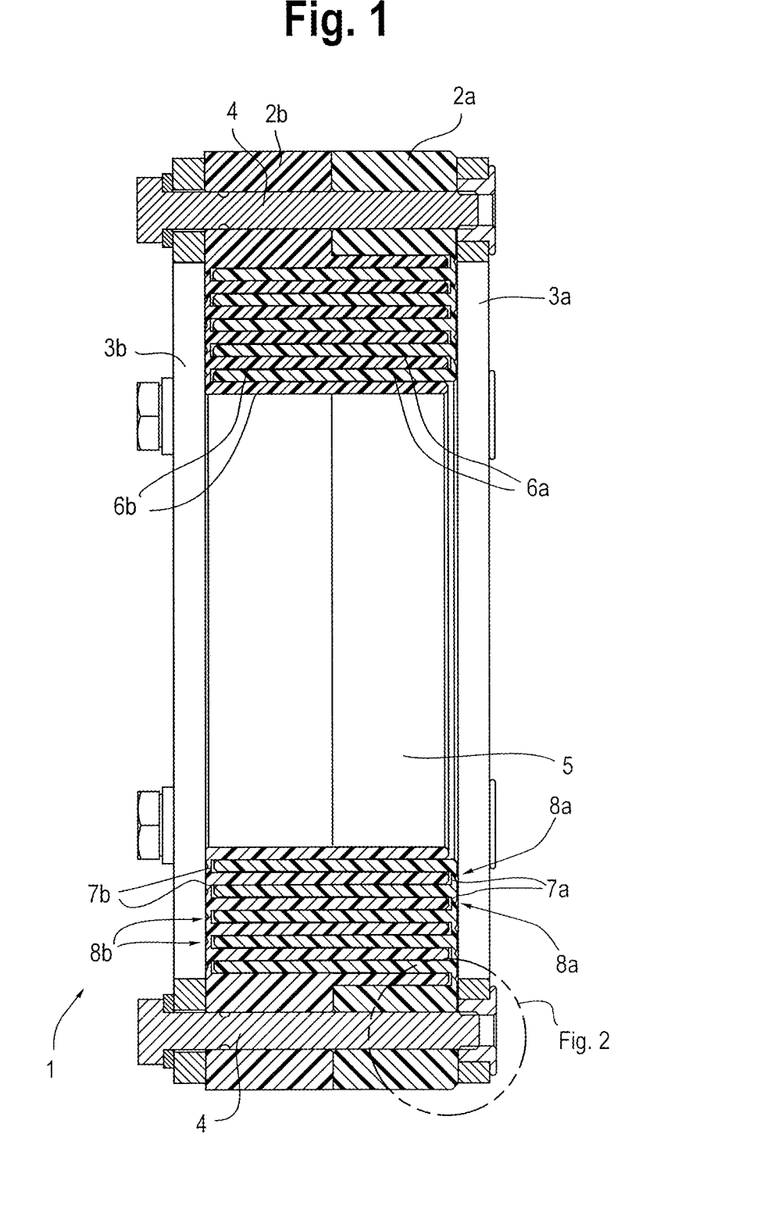
FIG. 1 a press seal according to the invention in a sectional side view.

FIG. 1 shows a press seal 1 according to the invention in a sectional side view. The elastomer body 2 is visible, which is embraced by two press plates 3. The two press plates 3 are functionally connected with each other via tensioning bolts 4 such that the press plates are moved towards each other by tensioning the tensioning bolts 4, the elastomer body 2 being compressed in between and, in consequence, sealingly contacting the soffit of a through-opening and a line led through (not shown).

In this example, the elastomer body 2 is assembled of two elastomer body parts 2a,b, each of them comprising a plurality of shells 6a,b extending circumferentially around the through hole 5 for the line. Likewise, each elastomer body part 2a,b can be manufactured by a forming procedure, for instance by pressing into a mold or by injection molding, because the intermediate spaces between the shells 6a,b of the respective elastomer body part 2a,b are sufficiently large. In the intermediate spaces resulting between the shells 6a of one elastomer body part 2a the shells 6b of the other elastomer body part 2b are arranged in the assembled elastomer body 2, and vice versa.

The shells 6,b can be taken out for adapting the through hole 5 to lines having a different outer diameter. Thereto, a respective material bridge 7a,b provided at an axial end of the respective shell 6a,b is opened. The material bridges 7a,b are marked at the front face by circumferential grooves 8a,b which also reduces the material thickness and simplifies the opening.

Figure 2:
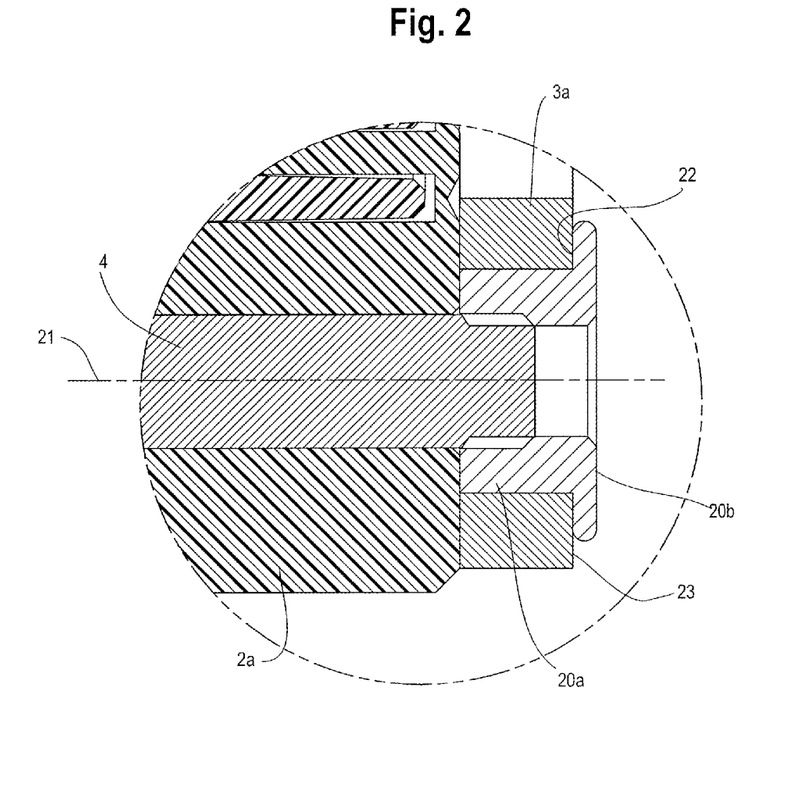
FIG. 2 a detailed view of the press seal according to FIG. 1

FIG. 2 shows in a detailed view the tensioning bolt 4 beared with respect to the press plate 3a in a manner according to the invention. With its threaded portion, the tensioning bolt 4 is screwed into a nut 20. This nut 20, a section 20a thereof lying proximal to the elastomer body 2, is held by a form-fit in a recess in the press plate 3a. A section 20b of the nut 20, which lies distal to the elastomer body 2, comprises a flange. The latter projects beyond the recess outwards, namely with respect to directions perpendicular to a rotational axis 21, the tensioning bolt 4 being screwed around this rotational axis into the nut 20.

With a contact area 22, the flange contacts the front face 23 of the press plate 3a, which lies distal to the elastomer body 2. When the tensioning bolt 4 is screwed further into the nut 20 for tensioning the elastomer body, the nut is held in the recess of the press plate 3a secured against a rotation, on the one hand; on the other hand, the section 20b with the flange, which lies distal to the elastomer body 2, forms a counter bearing, so that the press plate 3a is pressed onto the elastomer body 2. The elastomer body 2 is compressed in direction of the rotational axis 4 and expends perpendicularly thereto, contacting the line and the soffit.

Figure 3:
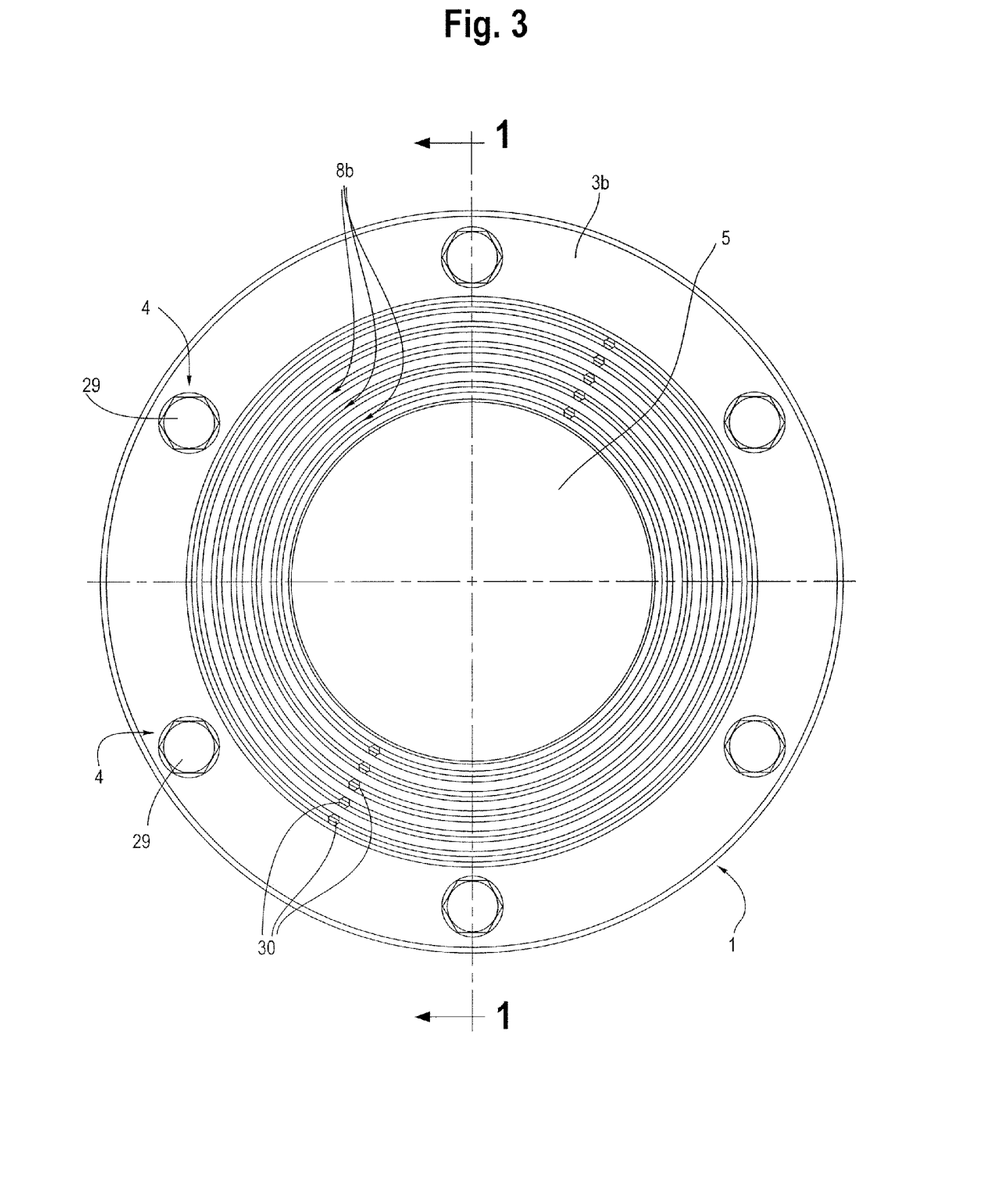
FIG. 3 the press seal of FIG. 1 in a top view.

FIG. 3 shows a press seal 1 according to the invention in a top view, namely looking onto the press plate 3b. At the latter, the respective tensioning bolts 4 have a bearing with a bolt head 29 with an external hexagonal profile, a washer being respectively provided in between the bolt head and the press plate. As described above, the through hole 5 is enclosed by a plurality of shells 6a,b for a diameter adaption, wherein the circumferential grooves 8b are visible in the top view. Further, vent holes 30 are shown in this top view, through which the air contained between the shells 6a,b can escape when the two elastomer body parts 2a,b are assembled.

What is claimed is:

1. A press seal (1) for forming a sealing closure of a through-opening intersected by a line, the press seal comprising:
    an elastomer body (2) for sealingly contacting said line;
    a press plate (3a) surrounding the line; and
    a tensioning bolt (4) intersecting said elastomer body (2),
    wherein said press plate (3a) can be pressed by said tensioning bolt (4) onto said elastomer body (2) in such a way, that said elastomer body (2) sealingly contacts said line;
    wherein a threaded portion of said tensioning bolt (4) is screwed into a nut (20) around a rotational axis (21), a first section (20a) of said nut (20) lies proximal to said elastomer body (2), is held by a form-fit in a recess in said press plate (3a), and is secured against a rotational movement around said rotational axis (21);
    wherein a second section (20b) of said nut (20) lies distal to said elastomer body (2) and comprises a flange which protrudes outward beyond said recess in directions perpendicular to said rotational axis (21) for transferring a force onto said press plate (3a) and pressing said press plate (3a) onto said elastomer body (2) when said tensioning bolt (4) is tensioned;
    wherein a front face (23) of said press plate (3a), which lies distal to said elastomer body (2), is flat in at least an area region which lies beneath said flange of said second section (20b); and
    wherein said press plate (3a) is a flat plate at least apart from an outer edge of said press plate (3a).

2. The press seal (1) according to claim 1, wherein said recess is defined by an inner surface of said press plate (3a), which meets said front face (23) and said flange contacts said front face (23).

3. The press seal (1) according to claim 1, wherein said press plate (3a) is made of metal.

4. The press seal (1) according to claim 3, wherein said press plate (3a) is worked from a sheet metal.

5. The press seal (1) according to claim 1, wherein said recess is defined by an inner surface of said press plate (3a), which extends solely in parallel to said rotational axis (21) and is free of a step.

6. The press seal (1) according to claim 5, wherein said recess is a portion of a through hole in said press plate (3a).

7. The press seal (1) according to claim 1, wherein said flange projects outwards beyond said recess perpendicularly to said rotational axis (21) and fully around said rotational axis (21).

8. The press seal (1) according to claim 1, wherein said flange contacts said press plate (3a) with a contact area (22), said contact area (22) being at least 1.1 times an area of a front face of said nut (20), said front face of said nut (20) lying proximal to said elastomer body (2).

9. The press seal (1) according to claim 1, wherein said tensioning bolt (4) comprises a bolt head (29) with a bolt head drive at an end of said tensioning bolt (4) opposite to said nut (20).

10. The press seal (1) according to claim 1 wherein said line is an electric, gas, water, heat, telecommunication, signal or data line, and wherein said through-opening is in a wall or a floor element.

11. The press seal (1) according to claim 10, wherein the wall or the floor element is of a building.

12. The press seal (1) according to claim 1, wherein said front face (23) is flat as a whole, and said press plate (3a) is a flat plate as a whole.

13. A press seal (1) for forming a sealing closure of a through-opening intersected by a line, the press seal comprising:
    an elastomer body (2) for sealingly contacting said line;
    a press plate (3a); and
    a tensioning bolt (4) intersecting said elastomer body (2),
    wherein said press plate (3a) can be pressed by said tensioning bolt (4) onto said elastomer body (2) in such a way, that said elastomer body (2) sealingly contacts said line;
    wherein a threaded portion of said tensioning bolt (4) is screwed into a nut (20) around a rotational axis (21), a first section (20a) of said nut (20) lies proximal to said elastomer body (2), is held by a form-fit in a recess in said press plate (3a), and is secured against a rotational movement around said rotational axis (21), said recess extending solely parallel to said rotation axis (21) and being free of a step;

wherein a second section (20*b*) of said nut (20) lies distal to said elastomer body (2) and comprises a flange which protrudes outward beyond said recess in directions perpendicular to said rotational axis (21) for transferring a force onto said press plate (3*a*) and pressing said press plate (3*a*) onto said elastomer body (2) when said tensioning bolt (4) is tensioned, said flange is flat, disc-shaped, and is completely spaced from said recess in a direction parallel to said rotational axis (21);

wherein said elastomer body (2) and said press plate (3*a*) are both annular members for surrounding said line; and wherein a front fact (23) of said press plate (3*a*) surrounds said recess, said front face (23) is flat and is part of said press plate (3*a*) that is most distal to said elastomer body (2), said flange contacting said front face (23).

14. A method for manufacturing the press seal (1) according to claim 1, comprising the steps f:

providing said press plate (3*a*) having said recess;
inserting said nut (20) into said recess;
arranging said elastomer body (2) and said press plate (3*a*) in contact with each other; and
subsequent to the preceding steps, inserting said tensioning bolt (4) so that said tensioning bolt (4) intersects said elastomer body (2), and screwing said tensioning bolt (4) into said nut (20).

15. The method according to claim 14, wherein said recess is cut into said press plate (3*a*) by laser cutting.

\* \* \* \* \*

UNITED STATES PATENT AND TRADEMARK OFFICE
CERTIFICATE OF CORRECTION

PATENT NO. : 9,915,379 B2
APPLICATION NO. : 15/326376
DATED : March 13, 2018
INVENTOR(S) : Senol Egritepe It is certified that error appears in the above-identified patent and that said Letters Patent is hereby corrected as shown below:

In Claim 13 (Column 9, Line 14), the word fact has been replaced with face, and in Line 15 is flat and is part of has been changed to is flat and is a part of.

In Claim 14 (Column 9, Line 19), the letter f has been replaced with the word of.

Signed and Sealed this
Twenty-ninth Day of May, 2018

Andrei Iancu
*Director of the United States Patent and Trademark Office*